United States Patent
Chuang et al.

(10) Patent No.: US 9,001,937 B2
(45) Date of Patent: Apr. 7, 2015

(54) SIGNAL LEVEL DECISION DEVICE AND METHOD

(71) Applicant: Realtek Semiconductor Corporation, Hsinchu (TW)

(72) Inventors: Sheng-Fu Chuang, Taichung (TW); Liang-Wei Huang, Hsinchu (TW); Hsuan-Ting Ho, Taichung (TW); Ching-Yao Su, Taichung (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 14/184,594

(22) Filed: Feb. 19, 2014

(65) Prior Publication Data

US 2014/0269974 A1    Sep. 18, 2014

(30) Foreign Application Priority Data

Mar. 14, 2013 (TW) .............................. 102109132 A

(51) Int. Cl.
*H04L 27/06* (2006.01)
*H04L 27/08* (2006.01)
*H04L 25/03* (2006.01)

(52) U.S. Cl.
CPC .......... *H04L 27/08* (2013.01); *H04L 25/03828* (2013.01)

(58) Field of Classification Search
USPC ......................................................... 375/340
See application file for complete search history.

(56) References Cited

U.S. PATENT DOCUMENTS

| 6,449,667 | B1 * | 9/2002 | Ganmukhi et al. | 710/28 |
| 6,714,563 | B1 * | 3/2004 | Kushi | 370/503 |
| 6,799,317 | B1 * | 9/2004 | Heywood et al. | 719/313 |
| 7,752,231 | B2 * | 7/2010 | Coker | 707/802 |
| 8,161,281 | B1 * | 4/2012 | Johnson et al. | 713/166 |
| 8,220,038 | B1 * | 7/2012 | Lucchesi et al. | 726/9 |
| 8,738,792 | B2 * | 5/2014 | Carlson et al. | 709/230 |
| 8,909,253 | B2 * | 12/2014 | Johnson et al. | 455/456.2 |

* cited by examiner

*Primary Examiner* — Erin File
(74) *Attorney, Agent, or Firm* — WPAT, P.C.; Anthony King

(57) ABSTRACT

The present invention discloses a signal level decision device to determine the level of a source signal. Said source signal comprises a plurality of source messages along a time axis; each source message corresponds to one of a plurality of normal levels; and each normal level is equivalent to at least one of a plurality of extension levels. The signal decision device comprises: a storage circuit to store the level information of the normal level(s) and the equivalent extension level(s) thereof in connection with some or all of the source messages; a transition parameter calculation circuit to calculate a plurality of transition parameters of the normal level and its equivalent extension level(s) in connection with each of the source messages according to the level information; and a decision circuit to determine the level of each of the source messages according to the plurality of transition parameters.

20 Claims, 10 Drawing Sheets

SIGNAL LEVEL DECISION DEVICE AND METHOD

BACKGROUND OF THE INVENTION

1. Field of the Invention

The present invention relates to a signal level decision device and method, especially to a signal level decision device and method capable of reducing the level transition quantity of a signal.

2. Description of Related Art

An electronic product will produce electromagnetic radiations during operation, and may interfere with the normal operation of other devices around it or be harmful to a human body. Therefore, most countries set regulations on the electromagnetic radiation of electronic products to prevent the electromagnetic interference (EMI) from bringing damage. In some fields, the regulations on EMI are extremely strict. For instance, to an automobile network communication device, the frequency spectrum of its signals should be confined to a low frequency band to abide by the automobile EMI regulations. Some prior art uses a low pass filter to filter the signals and thereby limits its frequency spectrum to a low frequency band for complying with the concerned regulations. However, to the automobile network communication device, such frequency spectrum confinement also means a loss to signal transmission distance and throughput. Therefore, how to prevent the loss under the request of EMI regulations is a serious subject for those working in this field.

SUMMARY OF THE INVENTION

In light of the above, a purpose of the present invention is to provide a signal level decision device and method to tackle the problems of said prior art.

Another purpose of the present invention is to provide a signal level decision device and method to reduce the level transition quantity of a signal, so as to reduce the high frequency component in the signal and thereby make the signal conform to an electromagnetic interference regulation.

The present invention discloses a signal level decision device to determine the level of a source signal. Said source signal includes a plurality of source messages along a time axis while each source message corresponds to one of a plurality of normal levels and each of the normal levels is equivalent to at least one of a plurality of extension levels. An embodiment of the signal level decision device comprises: a storage circuit to store the level information of the normal level(s) and the equivalent extension level(s) thereof in connection with some or all of the source messages; a transition parameter calculation circuit to calculate a plurality of transition parameters of the normal level and its equivalent extension level(s) in connection with each of the source messages according to the level information; and a decision circuit to determine the level of each of the source messages according to the plurality of transition parameters.

According to an embodiment of the device invention, the foresaid decision circuit is to determine the level of each of the source messages according to the normal level and/or the extension level(s) in connection with one or several smallest parameters among the transition parameters of said each of the source messages.

The present invention further discloses a signal level decision method to determine the level of a source signal. Said source signal includes a plurality of source messages along a time axis while each source message corresponds to one of a plurality of normal levels and each of the normal levels is equivalent to at least one of a plurality of extension levels. An embodiment of the signal level decision method comprises the following steps: storing the level information of the normal level(s) and the equivalent extension level(s) thereof in connection with some or all of the source messages; calculating a plurality of transition parameters of the normal level and its equivalent extension level(s) in connection with each of the source messages according to the level information; and determining the level of each of the source messages according to the plurality of transition parameters.

According to an embodiment of the method invention, the foresaid step of determining the level of each of the source messages comprises: determining the level of each of the source messages according to the normal level and/or the extension level(s) in connection with one or several smallest parameters among the transition parameters of said each of the source messages.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The disclosure of the present invention comprises a signal level decision device and method. Said device and method can reduce the level transition quantity of a signal to thereby reduce the high frequency component of the signal, and thus make the signal conform to a concerned regulation (e.g. an electromagnetic interference (EMI) regulation). Provided that an implementation is applicable, people of ordinary skill in the art can use elements, circuits, or steps equivalent to those described in this specification to carry out such implementation, which means that the embodiments in the following description are exemplary for understanding, not for limiting the present invention. Besides, some element of the signal level decision device of the present invention could be known by itself, and thus the detail of such element will be omitted in the following description provided that the remaining disclosure is still enough for understanding and enablement. Moreover, the signal level decision method of the present invention could be carried out by applicant's device invention or the equivalent thereof; therefore, the method invention will be discussed by focusing on steps instead of hardware details.

Figure 1:
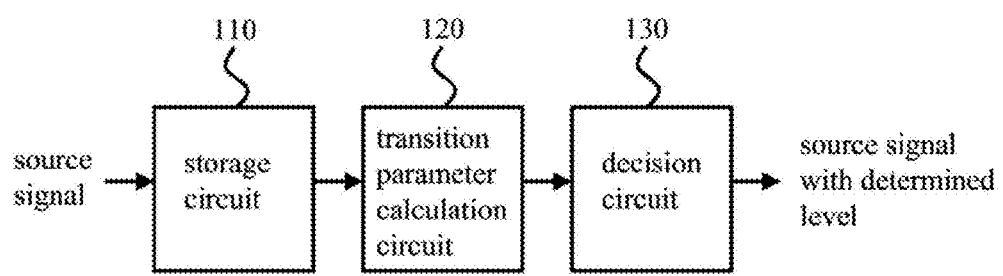
FIG. 1 illustrates an embodiment of the signal level decision device of the present invention.

Please refer to FIG. 1 which illustrates an embodiment of the signal level decision device of the present invention. The signal level decision device 100 is applicable to a communication device (e.g. an Ethernet network communication device in compliance with the 100 Base-T standard) for determining the level of a source signal. Said source signal comprises a plurality of source messages along a time axis; each source message corresponds to one of a plurality of normal levels; and each normal level is equivalent to one or more of a plurality of extension levels. For instance, the source signal is a pulse amplitude modulation (PAM) signal; the number of the normal level is 2M+1 (in which M is a positive integer), and the 2M+1 normal levels include −M, −M+1, ..., −1, 0, 1, ..., M−1, M levels; and the number of the extension levels is 2×(2M+1), and the 2×(2M+1) extension levels include −M−(2M+1), (−M+1)−(2M+1), ..., −M−2, −M−1, M+1, M+2, ..., (M−1)+(2M+1), M+(2M+1) levels, wherein any source message in connection with the number N normal level is equal to the source messages in connection with the number N−(2M+1) and N+(2M+1) extension levels. Said N is an integer between −M and M, and could be −M or M.

In light of the above, the signal level decision device 100 comprises: a storage circuit 110, a transition parameter calculation circuit 120 and a decision circuit 130. Said storage circuit is to store the level information of the normal level(s) and the equivalent extension level(s) thereof in connection with some or all of the foresaid source messages. For instance, please refer to table 1 below. Assuming that the plurality of source messages includes a number k source message in connection with a number k normal level and one or more number k extension levels, a number (k+1) source message in connection with a number (k+1) normal level and one or more number (k+1) extension levels, and a number (k+2) source message in connection with a number (k+2) normal level and one or more number (k+2) extension levels, the storage circuit 110 will store the level information of the normal and extension levels in connection with the number k, (k+1) and (k+2) source messages, wherein the parameter k is a positive integer and the number k, (k+1) and (k+2) source messages are three successive source messages along a time axis. Said transition parameter calculation circuit 120 is to calculate a plurality of transition parameters of the normal level and its equivalent extension level(s) in connection with each of the source messages according to the stored level information in which each of the normal and extension levels is related to one or more of the transition parameters. For instance, the transition parameter calculation circuit 120 can calculate a plurality of number (k+2) transition parameters of the number (k+2) normal and extension levels according to the above-mentioned level information of the number k, (k+1) and (k+2) source messages. Said decision circuit 130 is to determine the level of each source message according to the transition parameters of some or all of the source messages. In this embodiment, the decision circuit 130 determines the level of each of the source messages according to the normal level and/or the extension level(s) in connection with one or several smallest parameters among the transition parameters of said each of the source messages. For instance, the decision circuit 130 may determine the level of the number (k+2) source message according to the level in connection with the smallest parameter among the number (k+2) transition parameters of the number (k+2) source message, or determine the level of the number k or (k+1) source message according to the levels in connection with the smallest three parameters among the number (k+2) transition parameters.

TABLE 1

|  | #k source message | #(k + 1) source message | #(k + 2) source message |
| --- | --- | --- | --- |
| normal level | one #k normal level | one #(k + 1) normal level | one #(k + 2) normal level |
| extension level | one or more #k extension levels | one or more #(k + 1) extension levels | one or more #(k + 2) extension levels |

Please note that since people of ordinary skill in the art can carry out the aforementioned storage circuit 110, transition parameter calculation circuit 120 and decision circuit 130 with any or any combination of known storage circuits (e.g. buffer or FIFO (first-in first-out)), logic circuits (e.g. adder, subtractor and/or programmable logic circuit) and comparison circuits according to the disclosure in this specification, redundant description on details of a known circuit will be omitted provided that the disclosure and enablement requirements for this invention remain satisfied.

Figure 2:
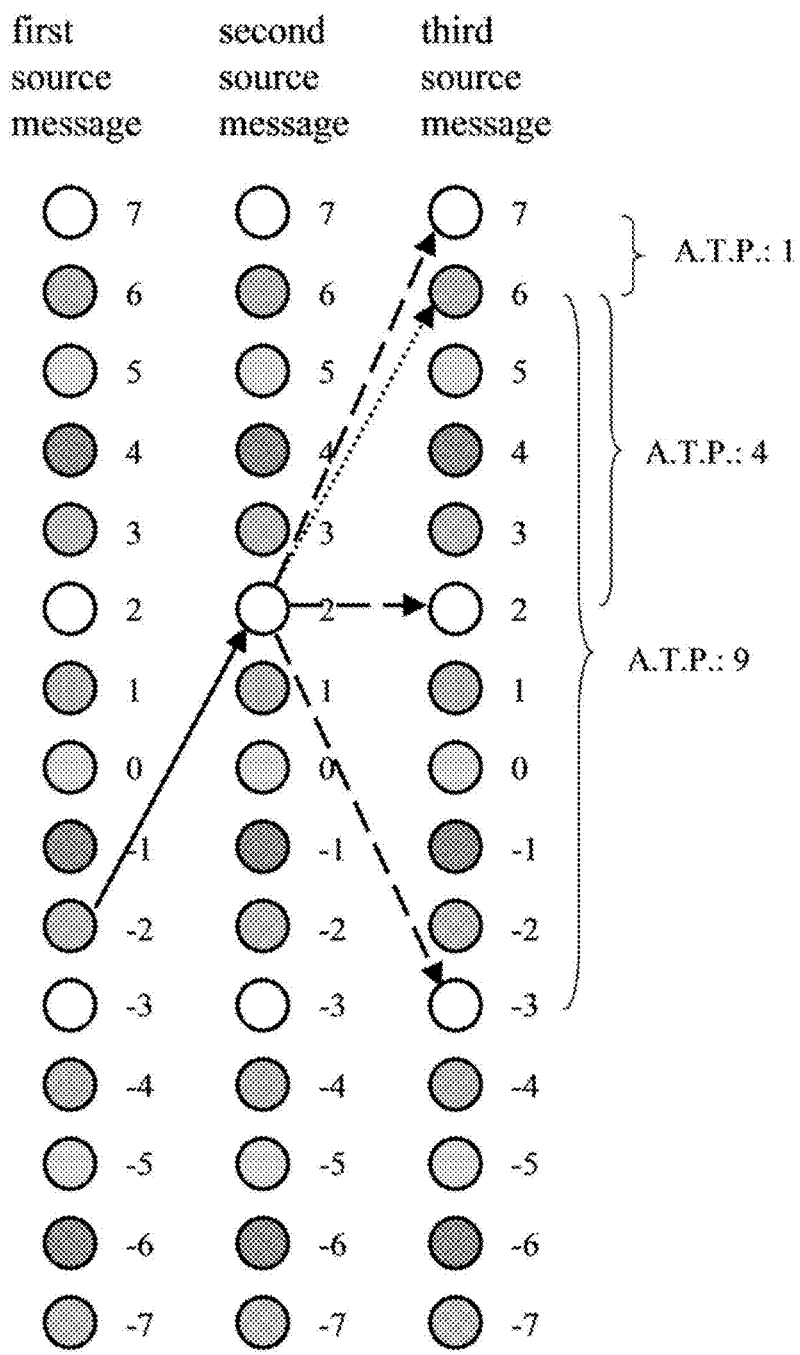
FIG. 2 illustrates an example of the operation processes of the transition parameter calculation circuit and the decision circuit in FIG. 1.

In the following description the algorithm of the transition parameter calculation circuit 120 and the decision process of the decision circuit 130 will be explained in detail. Please refer to FIG. 2 and table 2 below which assume that: a source signal includes a first source message, a second source message and a third source message; each of the source messages is connected with one of five normal Levels (e.g. −2, −1, 0, 1, 2); each of the normal levels is equivalent to two of ten Extension levels (e.g. −7, −6, −5, −4, −3, 3, 4, 5, 6, 7), that is to say that the number n normal level is equivalent to the number (n−5) extension level and the number (n+5) extension level; the level of said first source message has been determined to be the normal level −2 in connection with an accumulated transition parameter (A.T.P.) 0 in the beginning; the level of said second source message is the normal level 2 in connection with an accumulated transition parameter 0 in the beginning as well; and the level of the third source message is associated with the normal level 2 and its equivalent extension levels 7 and −3, but has not been determined yet. Accordingly, since the level difference between the first and second source messages is [2−(−2)]=4, if the level difference between the second and third source messages is also 4 (which means that the level of the third message should be a preliminary level 6 to accomplish the same level difference [6−2]=4), the two level differences will be the same and no transition is induced, so that the corresponding signal component in the frequency spectrum won't move to a high frequency band. However, as described in the above-mentioned assumption, the level of the third source message is connected with the normal level 2 and its extension levels 7 and −3 instead of the ideal preliminary level 6, and thus the decision circuit 130 can only choose a level among the levels 2, 7 and −3 to be the level of the third source message. If the level of the source message is determined to be the normal level 2, the level difference between the normal level 2 and the preliminary level 6 will be |2−6|=4; consequently, this level difference 4 will be deemed the third transition parameter in connection with said normal level 2 while the accumulated transition parameter of this normal level 2 will be 0+4=4. Similarly, if the level of the source message is determined to be the extension level 7, the level difference between the extension level 7 and the preliminary level 6 will be |7−6|=1; accordingly, this level difference 1 will be deemed the third transition parameter in connection with said extension level 7 while the accumulated transition parameter of this extension level 7 will be 0+1=1. Likewise, if the level of the source message is determined to be the extension level −3, the level difference between the extension level −3 and the preliminary level 6 will be |−3−6|=9, and then this level difference 9 will be deemed the third transition parameter in connection with said extension level −3 while the accumulated transition parameter of this extension level −3 will be 0+9=9. From the above analysis, it is clear that the smallest parameter among the transition parameters 4, 1 and 9 is 1, which means that the transition parameter calculation circuit 120 can derive the smallest third transition parameter and the smallest accumulated transition parameter by taking the extension level 7 as the level of the third source message; therefore, the decision circuit 130 should have the level of the third source message be 7 to thereby prevent the generation of high frequency component in the signal. In other words, a smaller accumulated transition parameter indicates a smoother signal with less high frequency components. Please note that in this embodiment if the level of the third source message has been determined by the decision circuit 130, the preceding first source message can be processed by a follow-up circuit. For instance, the first source message can be sent by an analog-front-end circuit then. Please also note that the follow-up circuit can process the first source message earlier provided that circuits in every stage can work normally.

TABLE 2

|  | first source message | second source message | third source message |
|---|---|---|---|
| normal level | −2 | 2 | 2 |
| extension level | not necessary | not necessary | 7, −3 |
| preliminary level | not necessary | not necessary | 6 |
| accumulated transition parameter (A.T.P.) | 0 | 0 | for normal level 2: \|6 − 2\| = 4 for extension level 7: \|6 − 7\| = 1 for extension level −3: \|6 − (−3)\| = 9 |
| level determination | already determined | already determined | 7 |

Figure 3:
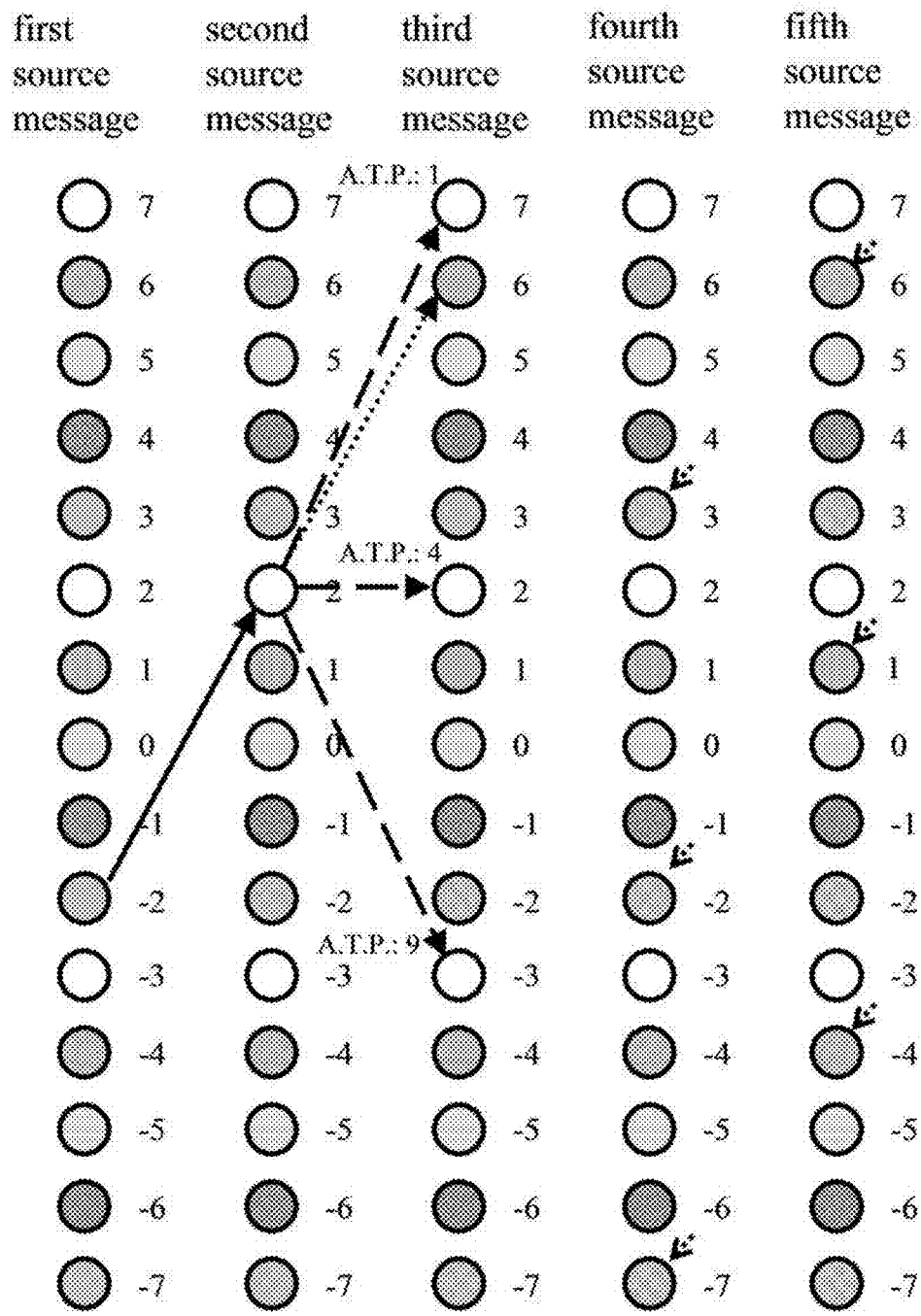
FIG. 3 illustrates another example of the operation processes of the transition parameter calculation circuit and the decision circuit in FIG. 1.

In light of the above, although the decision circuit 130 can determine the level of the third source message to be level 7 according to the smallest parameter among all candidate third transition parameters (i.e. A.T.P. 4, 1 and 9), the high frequency components may be produced thereafter if the level difference between the chosen level 7 and any of the levels in connection with the following source message is too much. Accordingly, the present invention may refer to the level information of the following source message previous to determining the level of the third source message, so as to make up for the mentioned problem in the example of FIG. 2. For instance, please refer to FIG. 3 which further includes a fourth source message and a fifth source message in comparison with FIG. 2 while other conditions remain unchanged. Said fourth source message is connected with the normal level −2 and its extension levels 3 and −7 (which are labeled by dotted arrowheads); and said fifth source message is associated with the normal level 1 and its extension levels 6 and −4 (which are labeled as well). As shown in FIG. 3, the level of the third source message has to be determined by further referring to the level information of the following source message (including the fourth source message), thus the level of the third source message could be level 7, 2 or −3 prior to the decision, and the necessary transition parameters (including the fore-disclosed third transition parameter 1, 4 and 9) and level information (including the level information of the second, third and fourth source messages) should be kept in the storage circuit 110 temporarily for the operation of the transition parameter calculation circuit 120 and/or the decision circuit 130 while unnecessary parameters and information could be discarded. To be more specific, the following description will discuss how the transition parameter calculation circuit 120 calculates the fourth transition parameters in connection with the candidate levels of the fourth source message and how the decision circuit 130 determines the level of the third source message or reduces the level options according to the fourth transition parameters.

Figure 4A:
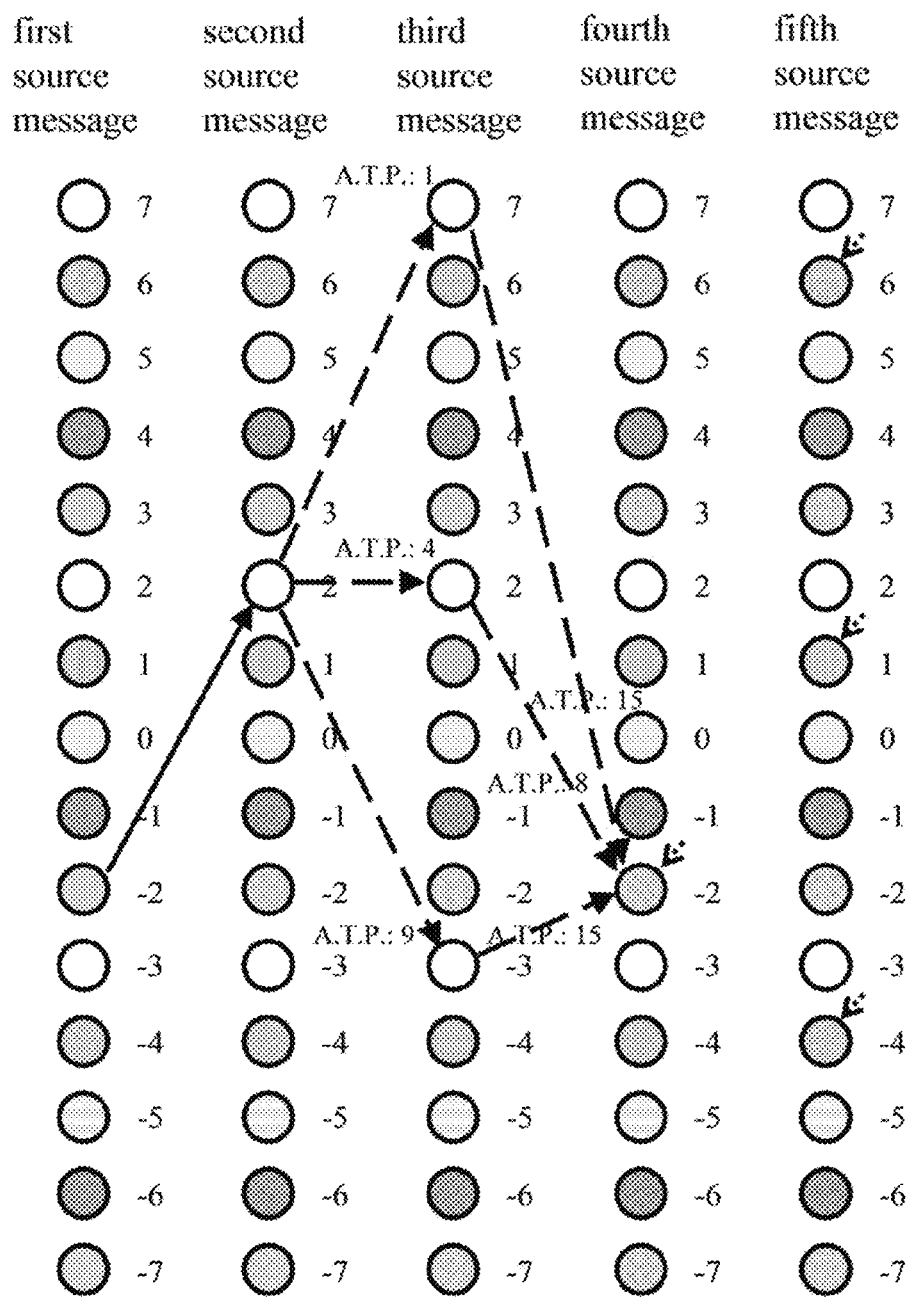
FIG. 4a illustrates the transition parameter calculation of the fourth source message in FIG. 3 on one condition.

(1) The Level of the Fourth Source Message is Presumed to be the Normal Level −2:

Please refer to FIG. 3, FIG. 4a and table 3 below. The level of the second source message has been determined to be level 2, and the level of the third source message could be one of the levels 2, 7 and −3 which are respectively associated with the third transition parameters 4, 1 and 9 (i.e. the accumulated transition parameters here). Therefore, the transition parameter calculation circuit 120 can derive three preliminary levels 2, 12 and −8 of the fourth source message from the way of FIG. 2; more specifically, these preliminary levels 2, 12 and −8 could be derived from the following equations: (2−2)+2=2, (7−2)+7=12, (−3−2)+(−3)=−8. Thereupon since the level of the fourth source message is presumed to be the normal level −2 in this case, the transition parameter calculation circuit 120 can calculate the level differences between the normal level −2 and each of the preliminary levels 2, 12 and −8, so as to derive the fourth transition parameters 4, 14 and 6 from the following equations: |−2−2|=4, |−2−12|=14, |−2−(−8)|=6. Afterward each of the fourth transition parameters and its corresponding third transition parameter are added up to obtain the accumulated transition parameters 8, 15 and 15 of the normal level −2 of the fourth source message in accordance with the equations: 4+4=8, 14+1=15, 6+9=15. And now it is clear that the smallest accumulated transition parameter is 8, which means that the accumulated transition parameter will be smallest when both the fourth and third transition parameters are 4. In other words, if the decision circuit 130 set the level of the fourth source message to be the normal level −2, it should set level 2 as the level of the third source message to achieve the smallest accumulated transition parameter 8.

Figure 4B:
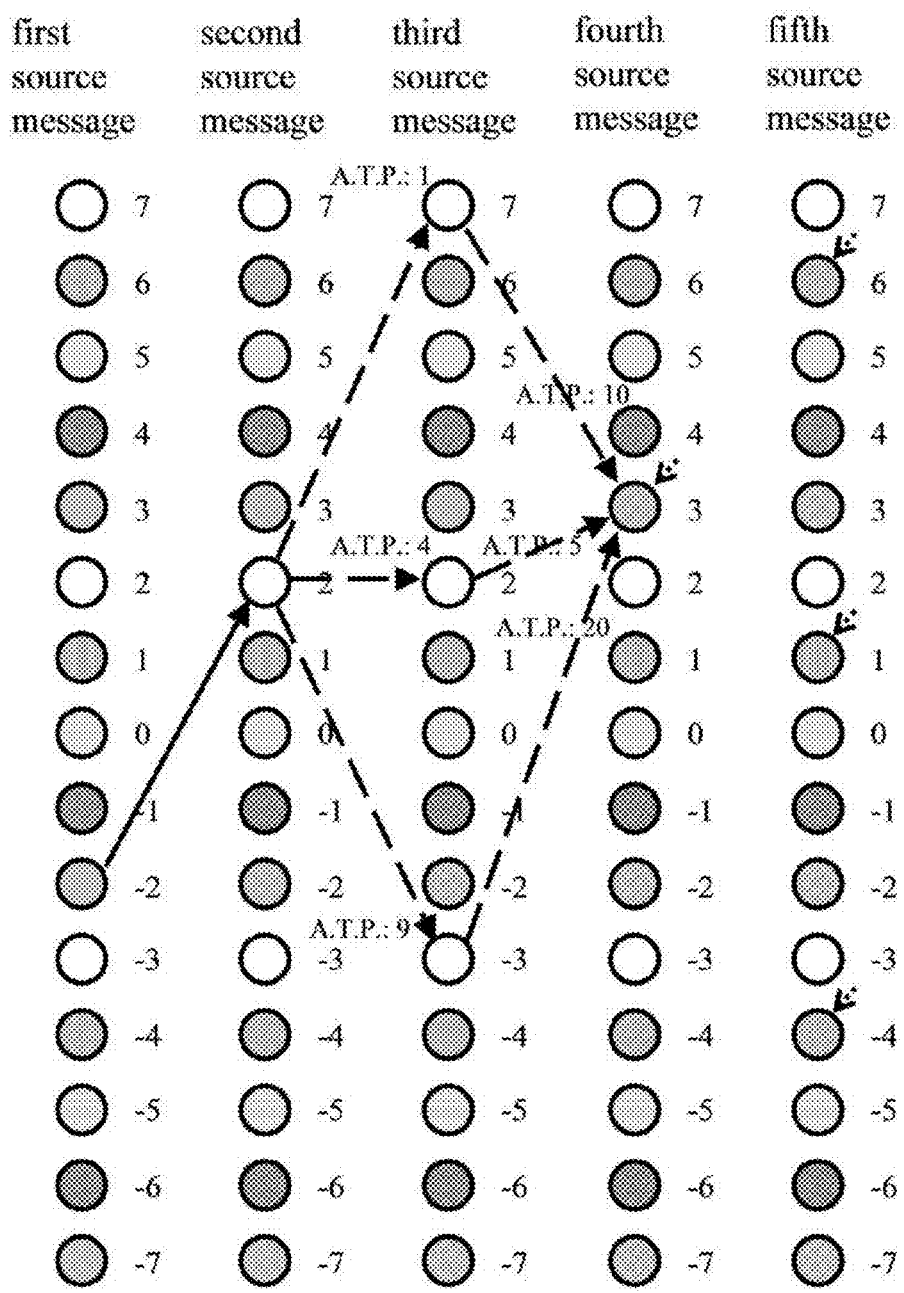
FIG. 4b illustrates the transition parameter calculation of the fourth source message in FIG. 3 on another condition.

(2) The Level of the Fourth Source Message is Presumed to be the Extension Level 3:

Please refer to FIG. 3, FIG. 4b and table 3 below. The level of the second source message has been determined to be level 2, and the level of the third source message could be one of the levels 2, 7 and −3 which are respectively associated with the third transition parameters 4, 1 and 9 (i.e. the accumulated transition parameters here). Therefore, the transition parameter calculation circuit 120 can derive three preliminary levels 2, 12 and −8 of the fourth source message from the way of FIG. 2; more specifically, these preliminary levels 2, 12 and −8 could be derived from the following equations: (2−2)+2=2, (7−2)+7=12, (−3−2)+(−3)=−8. Thereupon since the level of the fourth source message is presumed to be the extension level 3 in this case, the transition parameter calculation circuit 120 can calculate the level differences between the extension level 3 and each of the preliminary levels 2, 12 and −8, so as to derive the fourth transition parameters 1, 9 and 11 from the following equations: |3−2|=1, |3−12|=9, |3−(−8)|=11. Afterwards each of the fourth transition parameters and the corresponding third transition parameter thereof are added up to obtain the accumulated transition parameters 5, 10 and 20 of the extension level 3 of the fourth source message in accordance with the equations: 1+4=5, 9+1=10, 11+9=20. And now it is clear that the smallest accumulated transition parameter is 5, which means that the accumulated transition parameter will be smallest when the fourth transition parameter is 1 and third transition parameter is 4. In other words, if the decision circuit 130 set the level of the fourth source message to be the extension level 3, it should set level 2 as the level of the third source message to achieve the smallest accumulated transition parameter 5.

Figure 4C:
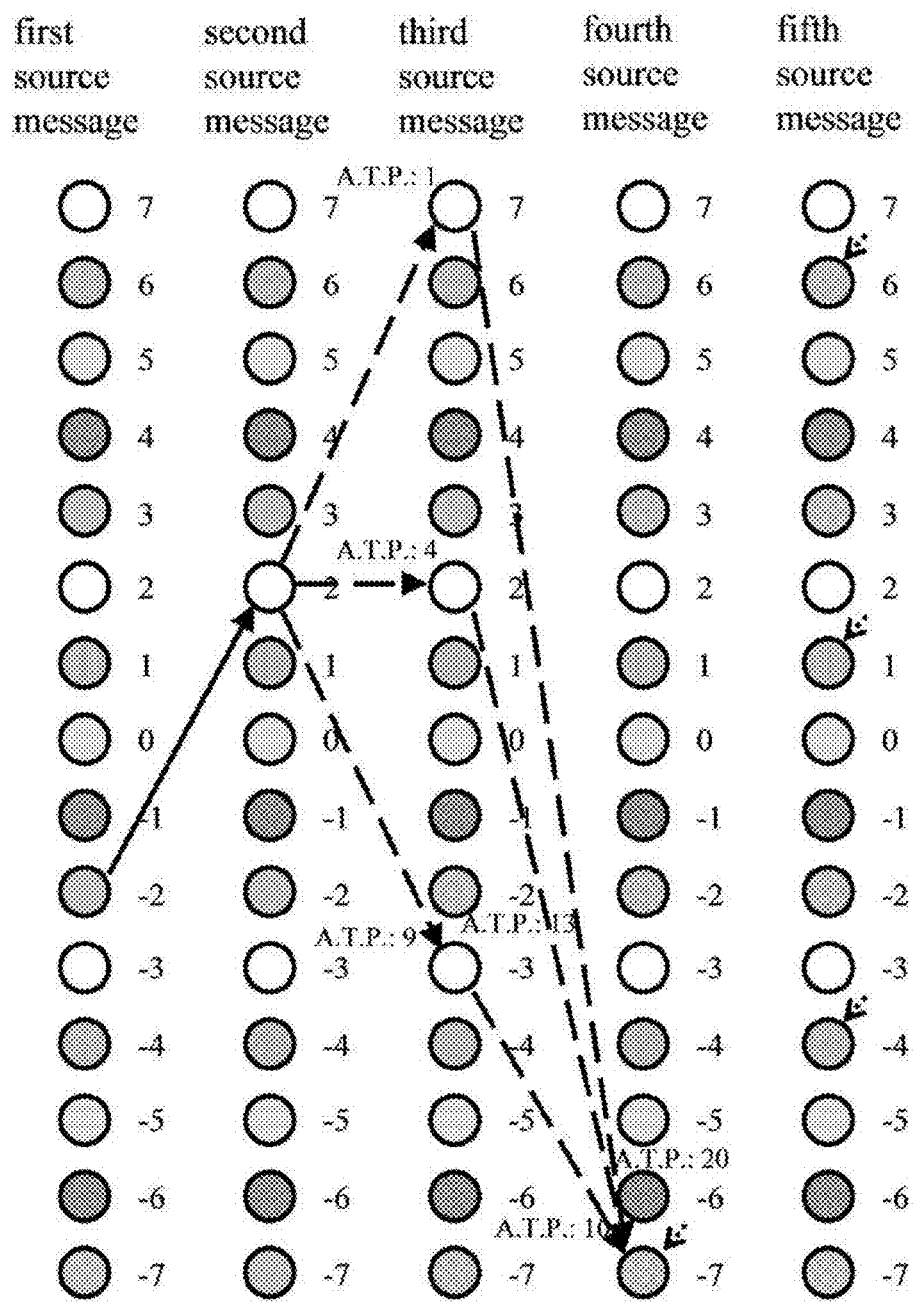
FIG. 4c illustrates the transition parameter calculation of the fourth source message in FIG. 3 on a further condition.

(3) The Level of the Fourth Source Message is Presumed to be the Extension Level −7:

Please refer to FIG. 3, FIG. 4c and table 3 below. The level of the second source message has been determined to be level 2, and the level of the third source message could be one of the levels 2, 7 and −3 which are respectively associated with the third transition parameters 4, 1 and 9 (i.e. accumulated transition parameters here). Therefore, the transition parameter calculation circuit 120 can derive three preliminary levels 2, 12 and −8 of the fourth source message from the way of FIG. 2; more specifically, these preliminary levels 2, 12 and −8 could be derived from the following equations: (2−2)+2=2, (7−2)+7=12, (−3−2)+(−3)=−8. Thereupon since the level of the fourth source message is presumed to be the extension level −7 in this case, the transition parameter calculation circuit 120 can calculate the level differences between the extension level −7 and each of the preliminary levels 2, 12 and −8, so as to derive the fourth transition parameters 9, 19 and 1 from the following equations: |−7−2|=9; |−7−12|=19; |−7−(−8)|=1. Then each of the fourth transition parameters and its corresponding third transition parameter are added up to obtain the accumulated transition parameters 13, 20 and 10 of the extension level −7 of the fourth source message in accordance with the equations: 9+4=13, 19+1=20, 1+9=10. Now it is clear that the smallest accumulated transition parameter is 10, which means that the accumulated transition parameter will be smallest when the fourth transition parameter is 1 and third transition parameter is 9. In other words, if the decision circuit 130 set the level of the fourth source message to be the extension level −7, it should set level −3 as the level of the third source message to achieve the smallest accumulated transition parameter 10.

TABLE 3

|  | first source message | second source message | third source message | fourth source message | fifth source message |
|---|---|---|---|---|---|
| normal level | −2 | 2 | 2 | −2 | 1 |
| extension level | not necessary | not necessary | 7, −3 | 3, −7 | 6, −4 |
| preliminary level | not necessary | not necessary | 6 | 2, 12, −8 | −6, 4, −11 |
| accumulated transition parameter | 0 | 0 | for normal level 2: \|6 − 2\| = 4; for extension level 7: \|6 − 7\| = 1; for extension level −3: \|6 − (−3)\| = 9 | for normal level −2: \|2 − (−2)\| + 4 = 8 ~~\|12 − (−2)\| + 1 = 15~~ ~~\|−8 − (−2)\| + 9 = 15~~; for extension level 3: \|2 − 3\| + 4 = 5 ~~\|12 − 3\| + 1 = 10~~ ~~\|−8 − 3\| + 9 = 20~~; for extension level −7: ~~\|2 − (−7)\| + 4 = 13~~ ~~\|12 − (−7)\| + 1 = 20~~ \|−8 − (−7)\| + 9 = 10 | for normal level 1: ~~\|−6 − 1\| + 8 = 15~~ \|4 − 1\| + 5 = 8 ~~\|−11 − 1\| + 10 = 22~~; for extension level 6: ~~\|−6 − 6\| + 8 = 20~~ \|4 − 6\| + 5 = 7 ~~\|−11 − 6\| + 10 = 27~~; for extension level −4: \|−6 − (−4)\| + 8 = 10 ~~\|4 − (−4)\| + 5 = 13~~ ~~\|−11 − (−4)\| + 10 = 17~~ |
| level determination | already determined | already determined | normal level 2 (whose transition parameter 4 will be associated with the smallest accumulated transition parameter later) | further information of the following source message is needed | further information of the following source message is needed |

According to the above discussion, case (2) can derive the smallest accumulated transition parameter 5, which means that the decision circuit 130 should set the level of the third source message to be level 2, so as to get the smallest accumulated transition parameter 5 for the optimal reduction of high frequency component in the corresponding signal provided that the level of the fourth source message is determined to be 3. Compared the embodiment of FIG. 2 with this embodiment, if the decision circuit 130 set the level of the third source message to be level 7 as taught by FIG. 2, the preliminary level of the fourth source message will be 12, and the smallest accumulated transition parameter will then be 10 (i.e. |12−3|+1=10 as shown in table 3) that is larger than the smallest accumulated transition parameter 5 in case (2) of the present embodiment, which implies that the embodiment of FIG. 2 achieves a worse performance on the reduction of high frequency component in the long run. However, since the level of the fourth source message should be determined in accordance with the level information of the fifth source message and thus could be a level other than level 3 in case (2), the optimal level of the third source message could still have other options according to the analysis of the accumulated transition parameters in connection with the fifth source message. To be more specific, the decision circuit 130 could determine the level of the third source message after the transition parameter calculation circuit 120 finished calculating the accumulated transition parameter related to each candidate level of the fifth source message. Of course the decision circuit 130 could take the simple way to set level 2 as the level of the third source message as analyzed above.

From the above, the level of the fourth source message in FIG. 3 could be determined by the level information of the fifth source message. Therefore, before the decision is done, the level of the fourth source message could be any of the levels −2, 3 and −7. According to FIGS. 4a to 4c and table 3, each of said levels −2, 3 and −7 is associated with three accumulated transition parameters. In order to prevent the following calculation on the transition parameters in connection with the fifth source message is too minute and complicated, the present embodiment will only keep the smallest accumulated transition parameter of each of the levels −2, 3 and −7 for analysis, wherein the level −2 is associated with the smallest accumulated transition parameter 8, the level 3 is associated with the smallest accumulated transition parameter 5, and the level −7 is associated with the smallest accumulated transition parameter 10. Said association is illustrated in table 3 in which the discarded accumulated parameters are marked with double strikethrough lines. Please note that people of ordinary skill in the art can still keep more or less information for analysis based on their demands or design requirements while such analysis can be derived from the disclosure of this specification. The foresaid smallest accumulated transition parameters 8, 5, and 10 and the level information thereof (including the level information of the third, fourth and fifth source messages) will be kept in the storage circuit 110 temporarily for the operation of the transition parameter calculation circuit 120 and/or the decision circuit 130. On the basis of the above, the following description will discuss how the transition parameter calculation circuit 120 calculates the fifth transition parameters in connection with the levels of the fifth source message, and how the decision circuit determines the level of the fourth source message or reduces its level options according to said fifth transition parameters; after that, the level of the third source message can be ascertained.

Figure 5A:
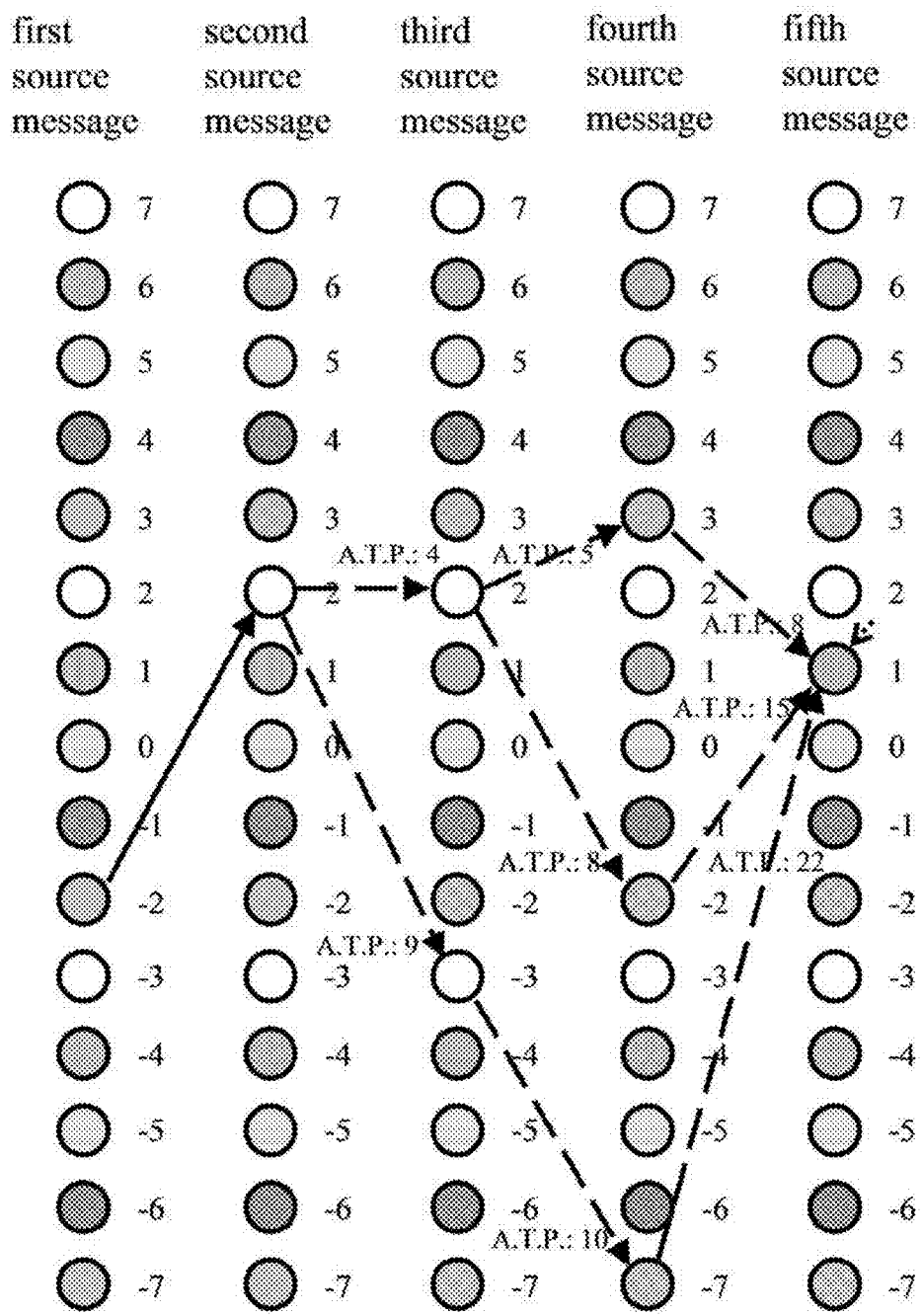
FIG. 5a illustrates the transition parameter calculation of the fifth source message in FIG. 3 on one condition.

(a) The Level of the Fifth Source Message is Presumed to be the Normal Level 1:

Please refer to FIG. 3, FIG. 5a and table 3 above. The level of the third source message could be 2, or −3 while the other level 7 is ruled out because it leads to none of the smallest accumulated transition parameters 5, 8 and 10 of the fourth source message; and the level of the fourth message could be one of levels 3, −2 and −7 which are respectively associated with the smallest accumulated transition parameters 5, 8 and 10. Accordingly, the transition parameter calculation circuit 120 can derive three preliminary levels 4, −6 and −11 of the fifth source message from the way of FIG. 2; more specifically, these preliminary levels 4, −6 and −11 could be derived from the following equations: $(3-2)+3=4$; $(-2-2)+(-2)=-6$; $[-7-(-3)]+(-7)=-11$. Thereupon since the level of the fifth source message is the normal level 1 in this case, the transition parameter calculation circuit 120 can calculate the level differences between the normal level 1 and each of the preliminary levels 4, −6 and −11, so as to derive the fifth transition parameters 3, 7 and 12 from the following equations: $|4-1|=3$; $|-6-1|=7$; $|-11-1|=12$. Then each of the fifth transition parameters and its corresponding fourth transition parameter are added up to obtain the accumulated transition parameters 8, 15 and 22 of the normal level 1 of the fifth source message in accordance with the equations: $3+5=8$; $7+8=15$; $12+10=22$. And now it is clear that the smallest accumulated transition parameter is 8, which means that the accumulated transition parameter of the fifth source message will be smallest when the fifth transition parameter is 3 and the last accumulated transition parameter of the fourth source message is 5. In other words, if the decision circuit 130 set the level of the fifth source message to be the normal level 1, it should set level 3 as the level of the fourth source message and level 2 as the level of the third source message to thereby achieve the smallest accumulated transition parameter 8.

Figure 5B:
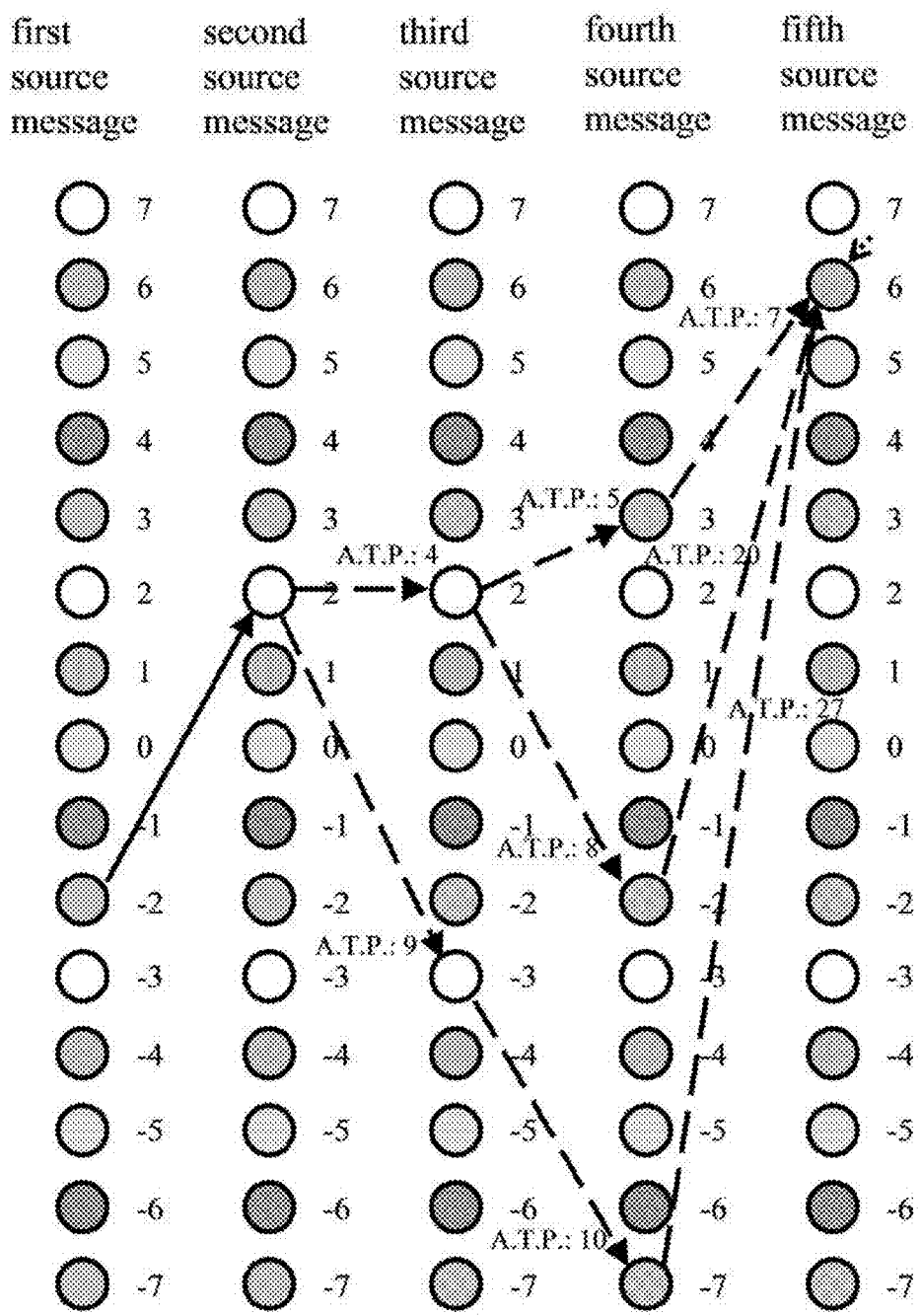
FIG. 5b illustrates the transition parameter calculation of the fifth source message in FIG. 3 on another condition.

(b) The Level of the Fifth Source Message is Presumed to be the Extension Level 6:

Please refer to FIG. 3, FIG. 5b and table 3 above. Like case (a) said, the level of the third source message could be 2, or −3 while the other level 7 is ruled out because it leads to none of the smallest accumulated transition parameters 5, 8 and 10 of the fourth source message; and the level of the fourth message could be one of levels 3, −2 and −7 which are respectively associated with the smallest accumulated transition parameters 5, 8 and 10. Accordingly the transition parameter calculation circuit 120 can derive three preliminary levels 4, −6 and −11 of the fifth source message from the way of FIG. 2; more specifically, the three preliminary levels 4, −6 and −11 could be derived from the following equations: $(3-2)+3=4$; $(-2-2)+(-2)=-6$; $[-7-(-3)]+(-7)=-11$. Thereupon since the level of the fifth source message is the extension level 6 in this case, the transition parameter calculation circuit 120 can calculate the level differences between the extension level 6 and each of the preliminary levels 4, −6 and −11, so as to derive the fifth transition parameters 2, 12 and 17 from the following equations: $|4-6|=2$; $|-6-6|=12$; $|-11-6|=17$. Afterwards each of the fifth transition parameters and its corresponding fourth transition parameter are added up to obtain the accumulated transition parameters 7, 20 and 27 of the extension level 6 of the fifth source message in accordance with the equations: $2+5=7$; $12+8=20$; $17+10=27$. Thus it is clear that the smallest accumulated transition parameter is 7, which means that the accumulated transition parameter of the fifth source message will be smallest when the fifth transition parameter is 2 and the last accumulated transition parameter of the fourth source message is 5. In other words, if the decision circuit 130 set the level of the fifth source message to be the extension level 6, it should set levels 3 and 2 as the levels of the fourth and third source messages respectively to thereby achieve the smallest accumulated transition parameter 7.

Figure 5C:
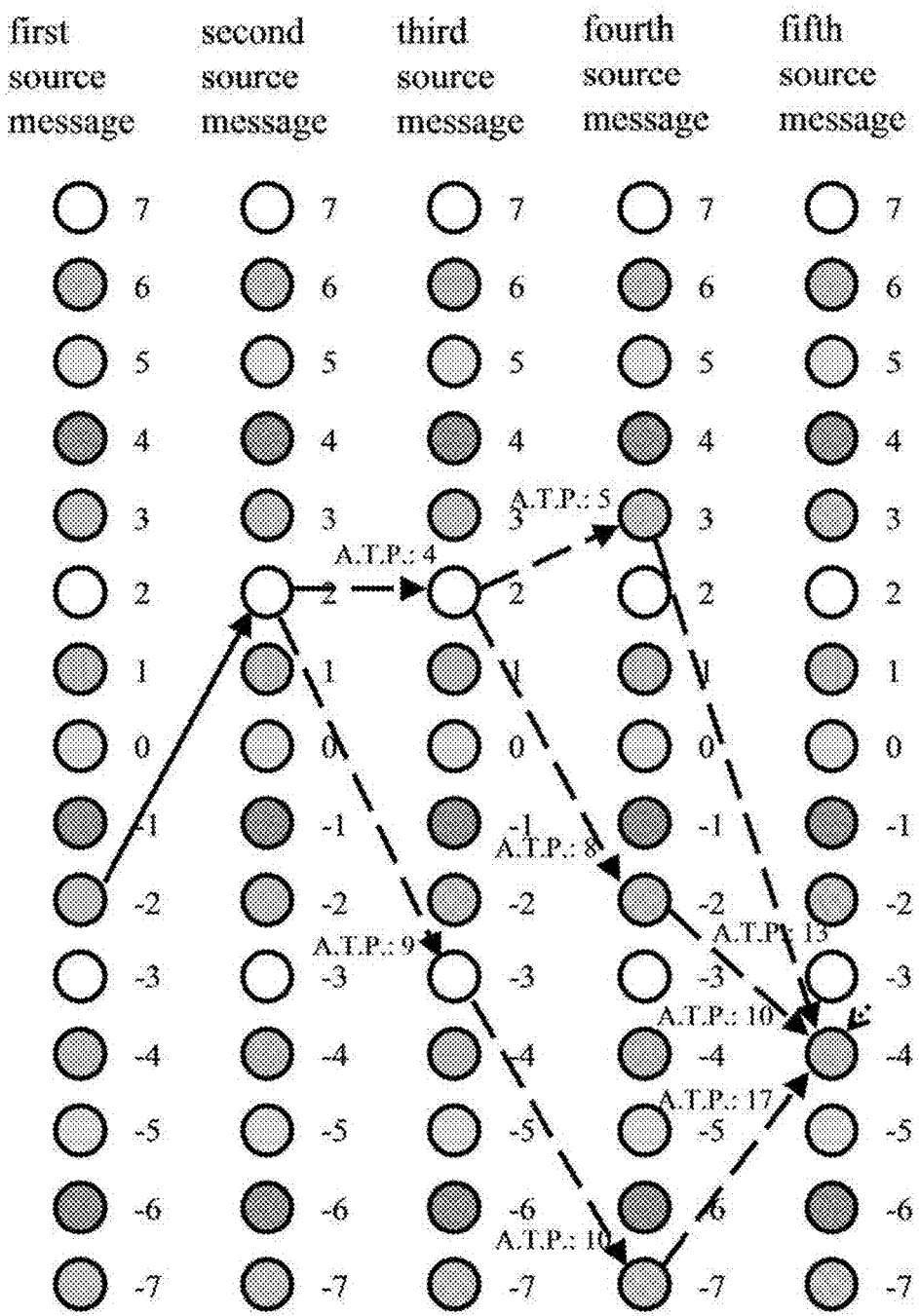
FIG. 5c illustrates the transition parameter calculation of the fifth source message in FIG. 3 on a further condition.

(c) The Level of the Fifth Source Message is Presumed to be the Extension Level −4:

Please refer to FIG. 3, FIG. 5c and table 3 above. Similarly, the level of the third source message could be 2, or −3 while the other level 7 is ruled out because it leads to none of the smallest accumulated transition parameters 5, 8 and 10 of the fourth source message; and the level of the fourth message could be one of levels 3, −2 and −7 which are respectively associated with the smallest accumulated transition parameters 5, 8 and 10. Accordingly the transition parameter calculation circuit 120 can derive three preliminary levels 4, −6 and −11 of the fifth source message from the way of FIG. 2; more specifically, the three preliminary levels 4, −6 and −11 could be derived from the following equations: $(3-2)+3=4$; $(-2-2)+(-2)=-6$; $[-7-(-3)]+(-7)=-11$. Thereupon since the level of the fifth source message is the extension level −4 in this case, the transition parameter calculation circuit 120 can calculate the level differences between the extension level −4 and each of the preliminary levels 4, −6 and −11, so as to derive the fifth transition parameters 8, 2 and 7 from the following equations: $|4|(-4)|=8$; $|-6|(-4)|=2$; $|-11-(-4)|=7$. Afterwards each of the fifth transition parameters and its corresponding fourth transition parameter are added up to obtain the accumulated transition parameters 13, 10 and 17 of the extension level −4 of the fifth source message in accordance with the equations: $8+5=13$; $2+8=10$; $7+10=17$. Therefore it is clear that the smallest accumulated transition parameter is 10, which means that the accumulated transition parameter of the fifth source message will be smallest when the fifth transition parameter is 2 and the last accumulated transition parameter of the fourth source message is 8. In other words, if the decision circuit 130 set the level of the fifth source message to be the extension level −4, it should set levels −2 and 2 as the levels of the fourth and third source messages respectively to thereby achieve the smallest accumulated transition parameter 10.

In light of the above, all cases (a), (b) and (c) show that setting level 2 as the level of the third source message can derive the smallest accumulated transition parameter. As a result, the level of the third source message is level 2 for sure. Besides, case (b) among the three cases leads to the smallest accumulated transition parameter 7, which means that if the decision circuit 130 sets the level of the fourth source message to be 3, the accumulated transition parameter of the fifth source message will be smallest provided that the level of the fifth source message is 6. As the previous description has told, the smallest accumulated transition parameter implies the optimal reduction of high frequency component in the corresponding signal.

Figure 6:
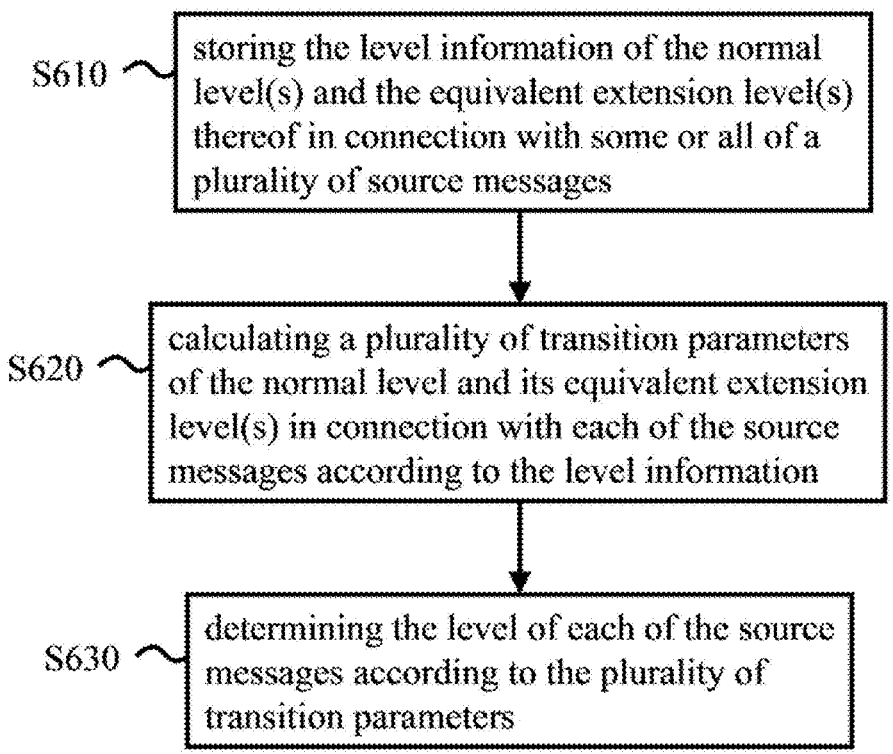
FIG. 6 illustrates an embodiment of the signal level decision method of the present invention.

In addition to the fore-disclosed device invention, the present invention also discloses a signal level decision method to determine the level of a source signal. Said method could be realized through the decision device of the present invention or the equivalent thereof. The definitions of the source signal and the source messages therein has been well explained in the previous paragraphs, and will not be repeated here. Please refer to FIG. 6, an embodiment of the signal level decision method comprises the following steps:

step S610: storing the level information of the normal level and the equivalent extension level(s) thereof in connection with some or all of the above-mentioned source messages;

step S620: calculating a plurality of transition parameters of the normal level and its equivalent extension level(s) in connection with each of the source messages according to the level information; and step S630: determining the level of each of the source messages according to the plurality of transition parameters.

Like the device embodiments said, assuming that the plurality of source messages includes a number k source message in connection with a number k normal level and one or more number k extension levels, a number (k+1) source message in connection with a number (k+1) normal level and one or more number (k+1) extension levels, and a number (k+2) source message in connection with a number (k+2) normal level and one or more number (k+2) extension levels, in an example of the present embodiment step S620 includes the step of calculating a plurality of number (k+2) transition parameters of the number (k+2) normal and extension levels according to the level information of the number k, (k+1) and (k+2) source messages while step S630 includes the step of determining the level of the number (k+2) source message to be one of the number (k+2) normal and extension levels according to the number (k+2) transition parameters. Besides, under the same assumption, in another example of the present embodiment step S620 includes the step of calculating a plurality of number (k+2) transition parameters of the number (k+2) normal and extension levels according to the level information of the number k, (k+1) and (k+2) source messages while step S630 includes the step of determining the level of the number k source message to be one of the number k normal and extension levels according to the number (k+2) transition parameters. Furthermore, under the same assumption, in a further example of the present embodiment step S620 includes the step of determining at least one preliminary level of the number (k+2) source message according to the level information of the number k and (k+1) source messages, and the step of calculating the level difference between the at least one preliminary level and each of the number (k+2) normal and extension levels and then calculating the number (k+2) transition parameters of the number (k+2) normal and extension levels in accordance with the derived level differences; consequently, steps S630 includes the step of determining the level of the number k source message to be one of the number k normal and extension levels according to the number (k+2) transition parameters or determining the level of the number (k+2) source message to be one of the number (k+2) normal and extension levels according to the number (k+2) transition parameters.

Additionally, like the device embodiments said, step S630 may further include the step of determining the level of each of the source messages according to the normal level and/or the extension level(s) in connection with one or several smallest parameters among the transition parameters of said each of the source messages.

Since those of ordinary skill in the art can fully appreciate and carry out the method embodiments by referring to the description of the foresaid device embodiments, repeated and unnecessary explanation will be omitted without dissatisfying the disclosure and enablement requirements. Please note that the steps of the method invention are not restricted to any specific order unless any step itself implies an order limitation.

To sum up, the signal level decision device and method can reduce the level transition quantity of a signal and thereby decrease the high frequency component of said signal, so that the loss to signal transmission distance and signal throughput can be avoided or relieved even though a predetermined regulation (such as an EMI regulation) dominates.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A signal level decision device to determine the level of a source signal which includes a plurality of source messages along a time axis while each source message corresponds to one of a plurality of normal levels and each of the normal levels is equivalent to at least one of a plurality of extension levels, comprising:

a storage circuit to store the level information of the normal level(s) and the equivalent extension level(s) thereof in connection with some or all of the source messages;

a transition parameter calculation circuit to calculate a plurality of transition parameters of the normal level and its equivalent extension level(s) in connection with each of the source messages according to the level information; and a decision circuit to determine the level of each of the source messages according to the plurality of transition parameters.

2. The signal level decision device of claim 1, wherein the number of the extension levels is 2 or more times the number of the normal levels (2M+1) while the M is a positive integer.

3. The signal level decision device of claim 1, wherein the decision circuit is to determine the level of each of the source messages according to the normal level and/or the extension level(s) in connection with one or several smallest parameters among the transition parameters of said each of the source messages.

4. The signal level decision device of claim 1, wherein the plurality of source messages includes a number k source message in connection with a number k normal level and at least one number k extension level, a number (k+1) source message in connection with a number (k+1) normal level and at least one number (k+1) extension level, and a number (k+2) source message in connection with a number (k+2) normal level and at least one number (k+2) extension level while the k is a positive integer.

5. The signal level decision device of claim 4, wherein the storage circuit is to store the level information of the number k, (k+1) and (k+2) source messages; the transition parameter calculation circuit is to calculate a plurality of number (k+2) transition parameters of the number (k+2) normal level and the at least one number (k+2) extension level according to said level information of the number k, (k+1) and (k+2) source messages; and the decision circuit is to determine the level of the number (k+2) source message to be one of the number (k+2) normal level and the at least one number (k+2) extension level according to said number (k+2) transition parameters.

6. The signal level decision device of claim 5, wherein the transition parameter calculation circuit is to execute at least the following steps:
determining at least one preliminary level of the number (k+2) source message according to the level information of the number k and (k+1) source messages; and
calculating the level differences between the number (k+2) normal level and the at least one preliminary level and between the at least one number (k+2) extension level and the at least one preliminary level, so as to calculate the number (k+2) transition parameters.

7. The signal level decision device of claim 6, wherein the level differences are the (k+2) transition parameters.

8. The signal level decision device of claim 6, wherein the storage circuit is to store a plurality of (k+1) transition parameters which are in connection with the number (k+1) normal level and the at least one number (k+1) extension level; and the transition parameter calculation circuit is to execute at least the following step: calculating the (k+2) transition parameters in accordance with the number (k+1) transition parameters and the level differences.

9. The signal level decision device of claim 4, wherein the storage circuit is to store the level information of the number k, (k+1) and (k+2) source messages; the transition parameter calculation circuit is to calculate a plurality of (k+2) transition parameters of the (k+2) normal level and the at least one number (k+2) extension level according to said level information of the number k, (k+1) and (k+2) source messages; and the decision circuit is to determine the level of the number k source message to be one of the number k normal level and the at least one number k extension level according to said number (k+2) transition parameters.

10. The signal level decision device of claim 9, wherein the transition parameter calculation circuit is to execute at least the following steps:
determining at least one preliminary level of the number (k+2) source message according to the level information of the number k and (k+1) source messages; and
calculating the level differences between the number (k+2) normal level and the at least one preliminary level and between the at least one number (k+2) extension level and the at least one preliminary level, so as to calculate the number (k+2) transition parameters.

11. The signal level decision device of claim 10, wherein the storage circuit is to store a plurality of (k+1) transition parameters which are in connection with the number (k+1) normal level and the at least one number (k+1) extension level; and the transition parameter calculation circuit is to execute at least the following step: calculating the (k+2) transition parameters in accordance with the number (k+1) transition parameters and the level differences.

12. The signal level decision device of claim 4, wherein the storage circuit is to store the level information of the number k, (k+1) and (k+2) source messages; and the transition parameter calculation circuit is to execute at least the following steps:
determining at least one preliminary level of the number (k+2) source message according to the level information of the number k and (k+1) source messages; and
calculating the level differences between the number (k+2) normal level and the at least one preliminary level and between the at least one number (k+2) extension level and the at least one preliminary level, so as to calculate a plurality of number (k+2) transition parameters of the number (k+2) normal level and the at least one number (k+2) extension level.

13. A signal level decision method to determine the level of a source signal which includes a plurality of source messages along a time axis while each source message corresponds to one of a plurality of normal levels and each of the normal levels is equivalent to at least one of a plurality of extension levels, comprising the following steps:
storing the level information of the normal level(s) and the equivalent extension level(s) thereof in connection with some or all of the source messages;
calculating a plurality of transition parameters of the normal level and its equivalent extension level(s) in connection with each of the source messages according to the level information; and
determining the level of each of the source messages according to the plurality of transition parameters.

14. The signal level decision method of claim 13, wherein the step of determining the level of each of the source messages comprises: determining the level of each of the source messages according to the normal and/or the extension level(s) in connection with one or several smallest parameters among the transition parameters of said each of the source messages.

15. The signal level decision method of claim 13, wherein the plurality of source messages includes a number k source message in connection with a number k normal level and at least one number k extension level, a number (k+1) source message in connection with a number (k+1) normal level and at least one number (k+1) extension level, and a number (k+2) source message in connection with a number (k+2) normal level and at least one number (k+2) extension level while the k is a positive integer.

16. The signal level decision method of claim 15, wherein the step of calculating the transition parameters comprises: calculating a plurality of number (k+2) transition parameters of the number (k+2) normal level and the at least one number (k+2) extension level according to the level information of the number k, (k+1) and (k+2) source messages; and the step of determining the level of each of the source messages comprises: determining the level of the number (k+2) source message to be one of the number (k+2) normal level and the at least one number (k+2) extension level according to said number (k+2) transition parameters.

17. The signal level decision method of claim 15, wherein the step of calculating the transition parameters comprises: calculating a plurality of (k+2) transition parameters of the (k+2) normal level and the at least one number (k+2) extension level according to the level information of the number k, (k+1) and (k+2) source messages; and the step of determining the level of each of the source messages comprises: determining the level of the number k source message to be one of the number k normal level and the at least one number k extension level according to said number (k+2) transition parameters.

18. The signal level decision method of claim 15, wherein the step of calculating the transition parameters comprises:
   determining at least one preliminary level of the number (k+2) source message according to the level information of the number k and (k+1) source messages; and
   calculating the level difference between the number (k+2) normal level and the at least one preliminary level and the level difference between the at least one number (k+2) extension level and the at least one preliminary level, so as to calculate a plurality of number (k+2) transition parameters of the number (k+2) normal level and the at least one number (k+2) extension level.

19. The signal level decision method of claim 18, wherein the step of determining the level of each of the source messages comprises:
   determining the level of the number k source message to be one of the number k normal level and the at least one number k extension level according to the number (k+2) transition parameters; or
   determining the level of the number (k+2) source message to be one of the number (k+2) normal level and the at least one number (k+2) extension level according to the number (k+2) transition parameters.

20. The signal level decision method of claim 13, wherein the source signal is a pulse amplitude modulation (PAM) signal.

* * * * *